United States Patent
Leuthardt et al.

(10) Patent No.: US 12,515,046 B2
(45) Date of Patent: Jan. 6, 2026

(54) SYSTEMS AND METHODS FOR DETECTING MOTONEURON EXCITABILITY

(71) Applicants: Washington University, St. Louis, MO (US); MUSC Foundation for Research Development, Charleston, SC (US)

(72) Inventors: Eric C. Leuthardt, St. Louis, MO (US); Peter Brunner, St. Louis, MO (US); Kara Donovan, St. Louis, MO (US); Aiko Thompson, Charleston, SC (US)

(73) Assignees: Washington University, St. Louis, MO (US); MUSC Foundation for Research Development, Charleston, SC (US)

( * ) Notice: Subject to any disclaimer, the term of this patent is extended or adjusted under 35 U.S.C. 154(b) by 568 days.

(21) Appl. No.: 17/936,986

(22) Filed: Sep. 30, 2022

(65) Prior Publication Data
US 2023/0110411 A1    Apr. 13, 2023

Related U.S. Application Data

(60) Provisional application No. 63/251,207, filed on Oct. 1, 2021.

(51) Int. Cl.
*A61N 1/36*    (2006.01)
*A61N 1/04*    (2006.01)

(52) U.S. Cl.
CPC ........ *A61N 1/36031* (2017.08); *A61N 1/0456* (2013.01); *A61N 1/36036* (2017.08)

(58) Field of Classification Search
CPC .............. A61N 1/36031; A61N 1/0456; A61N 1/36036; A61N 1/0472
See application file for complete search history.

(56) References Cited

U.S. PATENT DOCUMENTS

| | | | |
|---|---|---|---|
| 5,300,096 A  * | 4/1994 | Hall ................... | A61N 1/36003 607/48 |
| 2007/0179557 A1* | 8/2007 | Maschino .............. | A61N 2/008 607/45 |
| 2011/0301658 A1* | 12/2011 | Yoo .................... | A61N 1/36114 607/9 |
| 2013/0053926 A1* | 2/2013 | Hincapie Ordonez ..................... | A61B 5/296 607/62 |

(Continued)

OTHER PUBLICATIONS

Addorisio et al., "Investigational treatment of rheumatoid arthritis with a vibrotactile device applied to the external ear," *Bioelectronic Medicine*, 5(4): 11 pages (2019). doi:10.1186/s42234-019-0020-4.

(Continued)

*Primary Examiner* — James M Kish
*Assistant Examiner* — Natasha Patel
(74) *Attorney, Agent, or Firm* — Armstrong Teasdale LLP

(57) ABSTRACT

The present disclosure describes devices and methods for detecting motoneuron excitability in a subject in need. The method includes stimulating a cutaneous distribution of a patient's vagus nerve within a patient's ear with a nerve stimulating signal; detecting F-wave occurrence with an evoked electromyography paradigm; and adjusting one or more parameters of the nerve stimulating signal to change the F-wave occurrence.

20 Claims, 4 Drawing Sheets

(56) References Cited

U.S. PATENT DOCUMENTS

2017/0224990 A1* 8/2017 Goldwasser ......... A61N 1/0476
2019/0001135 A1* 1/2019 Yoo ................... A61N 1/36132

OTHER PUBLICATIONS

Chaudhry et al., "Aneurysmal subarachnoid hemorrhage lead to systemic upregulation of IL-23/IL-17 inflammatory axis," *Cytokine*, 97: 96-103 (2017). doi:10.1016/j.cyto.2017.05.025.

Chen et al., "Vagus Nerve Stimulation Attenuates Cerebral Microinfarct and Colitis-induced Cerebral Microinfarct Aggravation in Mice," *Frontiers in Neurology*, vol. 9, Article 798, 10 pages (2018). doi:10.3389/fneur.2018.00798.

Chou et al. "Early elevation of serum tumor necrosis factor-αis associated with poor outcome in subarachnoid hemorrhage," *J Investigative Medicine*, 60(7): 1054-1058 (2012). doi:10.2310/JIM.0b013e3182686932.

Chou, S. H-Y, "Inflammation, Cerebral Vasospasm, and Brain Injury in Subarachnoid Hemorrhage—A Shifting Paradigm and a New Beginning," *Critical Care Medicine*, 46(11): 1883-1885 (2018). doi:10.1097/CCM.0000000000003373.

Chyatte et al., "Inflammation and intracranial aneurysms," *Neurosurgery*, 45(5): 1137-1146, discussion 1146-1147 (1999). doi:10.1097/00006123-199911000-00024.

Chyatte et al., "Preliminary report: effects of high dose methylprednisolone on delayed cerebral ischemia in patients at high risk for vasospasm after aneurysmal subarachnoid hemorrhage," *Neurosurgery*, 21(2): 157-160 (1987). doi:10.1227/00006123-198708000-00004.

Croci et al., The relationship between IL-6, ET-1 and cerebral vasospasm, in experimental rabbit subarachnoid hemorrhage, *J Neurosurgical Sciences*, 63(3): 245-250 (2016). doi:10.23736/S0390-5616.16.03876-5.

De Oliveria Manoel, et al., "Neuroinflammation as a Target for Intervention in Subarachnoid Hemorrhage," *Frontiers in Neurology*, vol. 9, Article 292, 12 pages (2018). doi:10.3389/fneur.2018.00292.

Duris et al., "Early Dynamics of Interleukin-6 in Cerebrospinal Fluid after Aneurysmal Subarachnoid Hemorrhage," *J Neurological Surgery—Part A, Central European Neurosurgery*, 79(2): 145-151 (2018). doi:10.1055/s-0037-1604084.

Fassbender et al., "Inflammatory cytokines in subarachnoid haemorrhage: association with abnormal blood flow velocities in basal cerebral arteries," *J Neurol Neurosurgery Psychiatry*, 70(4): 534-537 (2001). doi:10.1136/jnnp.70.4.534.

Gomis et al., "Randomized, double-blind, placebo-controlled, pilot trial of high-dose methylprednisolone in aneurysmal subarachnoid hemorrhage," J Neurosurgery, 112(3): 681-688 (2010). doi:10.3171/2009.4.JNS081377.

Hashi et al., "Intravenous hydrocortisone in large doses in the treatment of delayed ischemic neurological deficits following subarachnoid hemorrhage—results of a multi-center controlled double-blind clinical study," *No To Shinkei*, 40(4): 373-382 (1988). Document in Japanese with English Abstract.

Hollig et al., "Association of early inflammatory parameters after subarachnoid hemorrhage with functional outcome: A prospective cohort study," *Clin Neurol Neurosurg*, 138: 177-183 (2015). doi:10.1016/j.clineuro.2015.08.030.

Huang et al., "Study on the expression and mechanism of inflammatory factors in the brain of rats with cerebral vasospasm," *Eur Rev Med Pharmacol Sci*, 21(12): 2887-2894 (2017).

Huston et al., "Transcutaneous vagus nerve stimulation reduces serum high mobility group box 1 levels and improves survival in murine sepsis," *Crit Care Med*, 35(12): 2762-2768 (2007). doi:10.1097/01.CCM.0000288102.15975.BA.

Jersey et al., "Cerebral Aneurysm," NCBI Bookshelf, Antaional Library of Medicine, National Institutes of Helath, StatPearls, Treasure Island, FL, updated Apr. 3, 2023, Published Jan. 2024. Downloaded from https://www.ncbi.nlm.nih.gov/books/NBK507902/.

Kaniusas et al., "Current Directions in the Auricular Vagus Nerve Stimulation I—A Physiological Perspective," *Front Neurosci*, vol. 13, Article 854, 23 pages (2019). doi:10.3389/fnins.2019.00854.

Kaniusas et al., "Current Directions in the Auricular Vagus Nerve Stimulation II—An Engineering Perspective," *Front Neurosci*, vol. 13, Article 772, 16 pages (2019). doi:10.3389/fnins.2019.00772.

Kataoka et al., "Structural fragility and inflammatory response of ruptured cerebral aneurysms. A comparative study between ruptured and unruptured cerebral aneurysms," *Stroke*, 30(7): 1396-1401 (1999). doi:10.1161/01.str.30.7.1396.

Koopman et al., "Vagus nerve stimulation inhibits cytokine production and attenuates disease severity in rheumatoid arthritis," *Proc Natl Acad Sci USA*, 113(29): 8284-8289 (2016). doi:10.1073/pnas.1605635113.

Koopman et al., "Balancing the autonomic nervous system to reduce inflammation in rheumatoid arthritis," *J Intern Med*, 282(1): 64-75 (2017). doi:10.1111/joim.12626.

Kryzewski et al., "High Leukocyte Count and Risk of Poor Outcome After Subarachnoid Hemorrhage: A Meta-Analysis," *World Neurosurg*, 135: e541-e547 (2020). doi:10.1016/j.wneu.2019.12.056.

Lerman, et al. "Noninvasive Transcutaneous Vagus Nerve Stimulation Decreases Whole Blood Culture-Derived Cytokines and Chemokines: A Randomized, Blinded, Healthy Control Pilot Trial," *Neuromodulation*, 19(3): 283-290 (2016). doi:10.1111/ner.12398.

Liu et al., "Effect of simvastatin in patients with aneurysmal subarachnoid hemorrhage: A systematic review and meta-analysis," *Am J Emerg Med*, 35(12):1940-1945 (2017). doi:10.1016/j.ajem.2017.09.001.

Lucke-Wold et al., "Aneurysmal Subarachnoid Hemorrhage and Neuroinflammation: A Comprehensive Review," *Int J Mol Sci*, 17(4): 497, 17 pgs., (2016). doi:10.3390/ijms17040497.

Lv et al., "Levels of Interleukin-1βB, Interleukin-18, and Tumor Necrosis Factor-α a in Cerebrospinal Fluid of Aneurysmal Subarachnoid Hemorrhage Patients May Be Predictors of Early Brain Injury and Clinical Prognosis," *World Neurosurg*, 111: e362-e373 (2018). doi:10.1016/j.wneu.2017.12.076.

Manno et al., "The safety and efficacy of cyclosporine A in the prevention of vasospasm in patients with Fisher grade 3 subarachnoid hemorrhages: a pilot study," *Neurosurgery*, 40(2): 289-293 (1997). doi:10.1097/00006123-199702000-00010.

Marshall et al., "Bioelectrical Stimulation for the Reduction of Inflammation in Inflammatory Bowel Disease," *Clin Med Insights Gastroenterol*, 8: 55-59 (2015). doi:10.4137/CGast.S31779.

Meneses et al., "Electric stimulation of the vagus nerve reduced mouse neuroinflammation induced by lipopolysaccharide," *J Inflamm (Lond)*, 13: 1-11 (2016). doi:10.1186/s12950-016-0140-5.

Mohney et al., "A Propensity Score Analysis of the Impact of Dexamethasone Use on Delayed Cerebral Ischemia and Poor Functional Outcomes After Subarachnoid Hemorrhage," *World Neurosurg*, 109: e655-e661 (2018). doi:10.1016/j.wneu.2017.10.051.

Nagahama et al., "Dual antiplatelet therapy in aneurysmal subarachnoid hemorrhage: association with reduced risk of clinical vasospasm and delayed cerebral ischemia," *J Neurosurg*, 129(3): 702-710. (2018). doi:10.3171/2017.5.JNS17831.

Nassiri et al., "A Propensity Score-Matched Study of the Use of Non-steroidal Anti-inflammatory Agents Following Aneurysmal Subarachnoid Hemorrhage," *Neurocrit Care*, 25(3): 351-358 (2016). doi:10.1007/s12028-016-0266-6.

Polak et al., "Far field potentials from brain stem after transcutaneous vagus nerve stimulation: optimization of stimulation and recording parameters," *J Neural Transm (Vienna)*. 116(10): 1237-1242 (2009). doi:10.1007/s00702-009-0282-1.

Provencio et al., "Subarachnoid hemorrhage and inflammation: bench to bedside and back," Roos KL, Worrall BB, eds. *Semin Neurol*. 25(4): 435-444 (2005). doi:10.1055/s-2005-923537.

Ryba et al., "Cyclosporine A prevents neurological deterioration of patients with SAH—a preliminary report," *Acta Neurochir (Wien)*, 112(1-2): 25-27 (1991). doi:10.1007/bf01402450.

(56) References Cited

OTHER PUBLICATIONS

Senbokuya et al., "Effects of cilostazol on cerebral vasospasm after aneurysmal subarachnoid hemorrhage: a multicenter prospective, randomized, open-label blinded end point trial," *J Neurosurg.* 118(1): 121-130 (2013). doi:10.3171/2012.9.JNS12492.

Shen et al., "Dissociation of vasospasm-related morbidity and outcomes in patients with aneurysmal subarachnoid hemorrhage treated with clazosentan: a meta-analysis of randomized controlled trials," *J Neurosurg.* 119(1): 180-189 (2013). doi:10.3171/2013.3.JNS121436.

Singh et al., "The effect of intravenous interleukin-1 receptor antagonist on inflammatory mediators in cerebrospinal fluid after subarachnoid haemorrhage: a phase II randomised controlled trial," *J Neuroinflammation.* 11(1): 1-8 (2014). doi:10.1186/1742-2094-11-1.

Sinniger et al., "A 12-month pilot study outcomes of vagus nerve stimulation in Crohn's disease," *Neurogastroenterol Motil*, 32(10): e13911 (2020). doi:10.1111/nmo.13911.

Suzuki et al., "Noninvasive Vagus Nerve Stimulation Prevents Ruptures and Improves Outcomes in a Model of Intracranial Aneurysm in Mice," *Stroke*, 5: 1216-1223 (2019). doi:10.1161/STROKEAHA.118.023928.

Thelin et al., "Monitoring the Neuroinflammatory Response Following Acute Brain Injury," *Front Neurol*, 8: 351 (2017). doi:10.3389/fneur.2017.00351.

Vlachogiannis et al., "Interleukin-6 Levels in Cerebrospinal Fluid and Plasma in Patients with Severe Spontaneous Subarachnoid Hemorrhage," *World Neurosurg*, 122: e612-e618 (2019). doi:10.1016/j.wneu.2018.10.113.

Weir, B. "Unruptured intracranial aneurysms: a review," *J Neurosurg*, 96(1): 3-42 (2002). doi:10.3171/jns.2002.96.1.0003.

Zhao et al., "Non-invasive Vagus Nerve Stimulation Protects Against Cerebral Ischemia/Reperfusion Injury and Promotes Microglial M2 Polarization Via Interleukin-17A Inhibition," *J Mol Neurosci*, 67(2): 217-226 (2019). doi:10.1007/s12031-018-1227-7.

\* cited by examiner

SYSTEMS AND METHODS FOR DETECTING MOTONEURON EXCITABILITY

CROSS REFERENCE TO RELATED APPLICATIONS

This application claims the benefit of and priority to U.S. Provisional Patent Application No. 63/251,207, filed Oct. 1, 2021, entitled "SYSTEMS AND METHODS FOR DETECTING MOTONEURON EXCITABILITY," which is hereby incorporated by reference in its entirety.

STATEMENT REGARDING FEDERALLY SPONSORED RESEARCH OR DEVELOPMENT

This invention was made with government support under EB026439 awarded by the National Institutes of Health. The government has certain rights in the invention.

FIELD OF THE DISCLOSURE

The present disclosure generally relates to systems and methods of detecting and affecting motoneuron excitability in a motor-impaired subject.

BACKGROUND OF THE DISCLOSURE

Each year, over 50% of the nearly 800,000 Americans that suffer a stroke will experience prolonged upper limb motor deficits six months post-injury. While an abundance of stroke rehabilitation strategies already exists, there remain at least several barriers that limit patients' ability to improve. Many stroke rehabilitation strategies are dependent on the patient having considerable residual motor function, rendering them ineffective for those with severe hemiparesis or complete hemiplegia. Also, the vast majority of approaches do not use the patient's own neuronal activity, thus limiting their ability to maximize their central plasticity.

Vagus nerve stimulation (VNS) has emerged as a tool to promote and accelerate neuroplasticity in both healthy and injured brains, attributed in part to the release of plasticity-promoting neuromodulators at the cellular level. The vagus nerve is a mixed-fiber nerve that affects many upstream cortical and subcortical structures. Non-invasive transcutaneous auricular VNS (taVNS) has been demonstrated to improve post-stroke functional recovery. Despite encouraging preclinical and clinical results, the neural response to non-invasive VNS and the mechanism through which it affects functional motor recovery remain poorly understood in humans. This gap has limited the advancement of this therapeutic strategy. There is currently no method for optimizing the stimulation procedure on an individual patient level as well as continuously monitoring motoneuron excitability in motor-related applications.

In rehabilitating severely motor-impaired stroke survivors in the chronic phase of recovery, vagus nerve stimulation (VNS) has emerged as a tool to promote and accelerate neuroplasticity. Because surgical implantation limits the widespread adoption of this approach, non-invasive transcutaneous auricular VNS (taVNS) has been investigated as a non-invasive, low-risk, and exciting scalable alternative.

Furthermore, the associated enhanced functional recovery occurs within weeks and is currently the only measure that determines the effectiveness of VNS for individual patients. The delay between taVNS therapy and clinical improvement makes optimizing stimulation parameters a difficult and lengthy process. taVNS efficacy is dependent on selecting the appropriate stimulation parameters, and this efficacy is currently only determined by outcomes which occur over multiple weeks. The delay between taVNS therapy and clinical improvement makes optimizing stimulation parameters a difficult and lengthy process. As such, there is a need for a biomarker to rapidly titrate taVNS parameters.

BRIEF DESCRIPTION

In a first aspect, a method for detecting motoneuron excitability in a subject in need is provided. The method includes stimulating a cutaneous distribution of a patient's vagus nerve within the patient's ear with a nerve stimulating signal. The method also includes detecting F-wave occurrence with an evoked electromyography paradigm. The method further includes adjusting one or more parameters of the nerve stimulating signal to change the F-wave occurrence.

In a second aspect, a system for detecting motoneuron excitability in a subject in need is provided. The system includes an electrical stimulation device including one or more electrodes. The electrical stimulation device is configured to provide an electrical current to a patient's vagus nerve with an electrical signal. The electrical signal is configured to stimulate a cutaneous distribution of a patient's vagus nerve within the ear with a nerve stimulating signal. The system further includes at least one sensor configured to detect F-wave occurrence with an evoked electromyography paradigm. The electrical stimulation device is further configured to adjust one or more parameters of the nerve stimulating signal to change the F-wave occurrence.

BRIEF DESCRIPTION OF THE DRAWINGS

Those of skill in the art will understand that the drawings, described below, are for illustrative purposes only. The drawings are not intended to limit the scope of the present teachings in any way.

Figure 1:
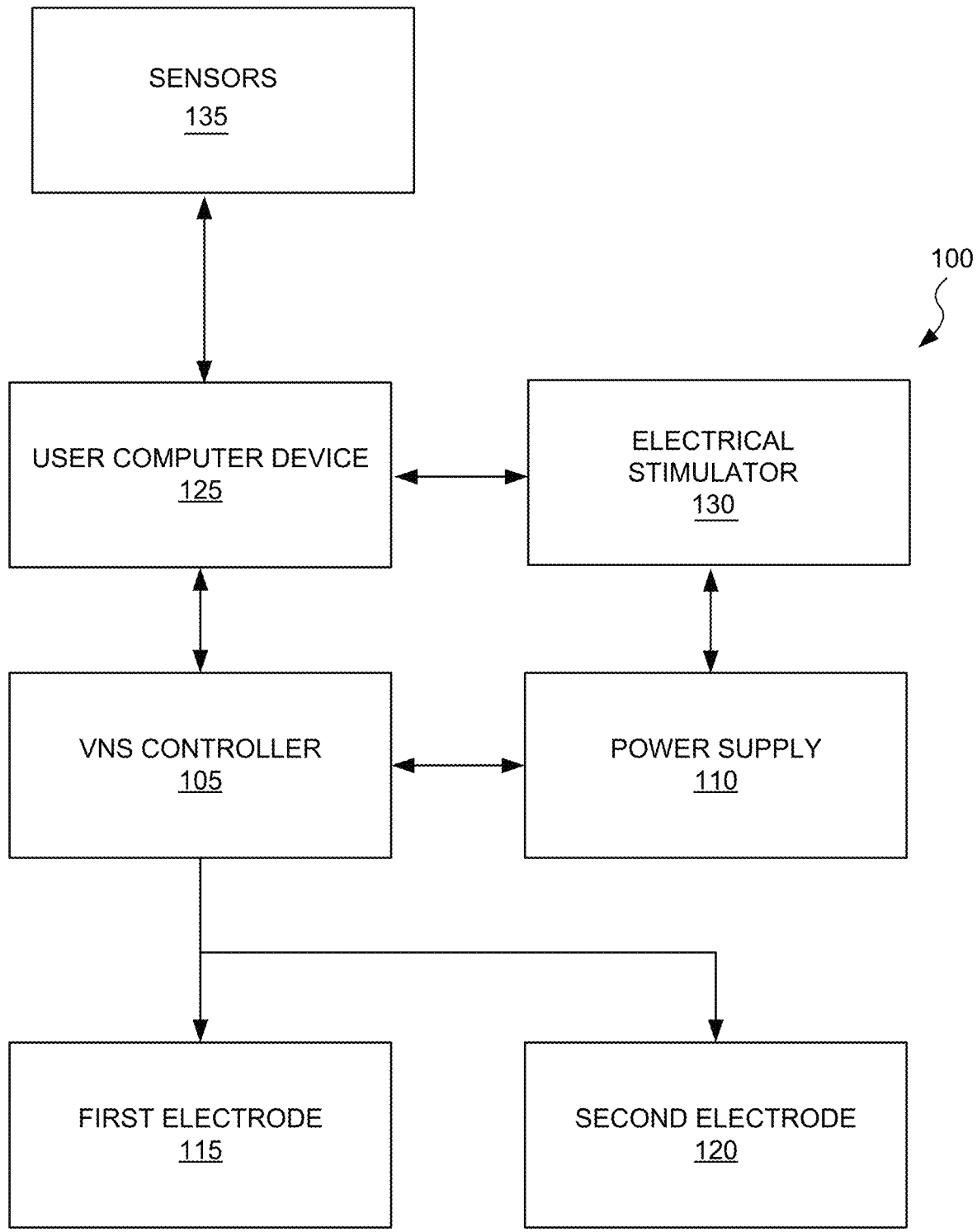
FIG. 1 illustrates a system for monitoring a patient for biomarkers while providing vagal nerve stimulation to the patient in accordance with at least one embodiment.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION OF THE INVENTION

Among the various aspects of the present disclosure is the provision of systems and methods for rehabilitating a motor function in a motor-impaired subject in need. The motor impairment in the subject may result from any known injury, affliction, or disorder associated with motor impairment without limitation. Non-limiting examples of an injury, affliction, or disorder that may be rehabilitated using the systems and methods disclosed herein include a stroke such as a unilateral stroke, a spinal cord injury, a neuromuscular disorder, a traumatic brain injury, a limb amputation, a peripheral nerve injury, and any other associated with motor impairment.

In various aspects, the disclosed system for rehabilitating a motor function includes the use the frequency of F-wave occurrence within an evoked electromyography (EMG) paradigm as a rapid biomarker of motoneuron excitability. The taVNS intensity can directly affect F-wave frequency, specifically that moderate amplitudes of taVNS reduce the frequency of F-waves, but higher amplitudes conversely increase the frequency of F-waves. This is based on the functional anatomy of descending spinal cord pathways originating from the brainstem, where auricular branch vagal fibers terminate; i.e., the pontine and medullary reticulospinal tracts. Within the context of this pathway, at lower intensities, taVNS activates fibers of the medullary reticulospinal tracts, which have an inhibitory effect on spinal reflexes, but that once a certain intensity is reached, taVNS activates pontine reticulospinal tract fibers, which have faciliatory effects on muscle tone and spinal reflexes.

The overall objective of these systems and methods is twofold, involving both to ensure taVNS does not negatively influence spasticity in stroke patients, as well as the application of evoked EMG as a titration procedure to further optimize taVNS parameters. Considering the prevalence of spasticity in chronic stroke patients, the effect that this therapeutic strategy has on motoneuron excitability greatly improves the ability to detect how effective taVNS for stroke rehab is per patient. Furthermore, based on individual anatomical differences, it is likely that stimulation parameters that work well for one patient may not work for another, and could even have a detrimental effect. Consequently, an evoked EMG paradigm would be ideal as a straightforward and quick approach to optimize taVNS parameters prior to a patient beginning an entire motor rehabilitation protocol.

The F-wave is a well-defined metric for motoneuron excitability, elicited using evoked electromyography. The systems and methods described herein makes use of F-wave occurrence to determine effective taVNS parameters for each patient. Specifically, taVNS, if administered at the optimal parameters, reduces motoneuron excitability, thereby altering the occurrence of the F-wave. This relationship can be capitalized on via a closed-loop system that rapidly tests taVNS parameters for effectiveness, allowing patient-specific optimization. For stroke patients, this system would be instrumental in maximizing the potential for rehab benefits while reducing excitability of the spinal cord, and thus influencing spasticity.

The system and methods described herein fit a need for real-time physiological feedback during taVNS in terms of a closed-loop taVNS and F-wave paired system. Use of taVNS is a growing trend in the field of neuromodulation, yet there is currently no method for optimizing the stimulation procedure on an individual patient level as well as continuously monitoring motoneuron excitability in motor-related applications. Clinical markets where this technology is needed are vast, including stroke/neuroplasticity, depression, inflammation, metabolic disorders, diabetes, neurodegenerative disorders, and cognitive enhancement. By providing a real-time metric of motoneuron excitability during taVNS via F-wave occurrence, these systems and methods enable patient-specific parameter optimization in a market where the trend towards individualized healthcare is well-demonstrated.

The systems and methods described herein provide key insights into a critical question for the further development of transcutaneous auricular vagus nerve stimulation (taVNS) as a neuromodulation technique for stroke rehabilitation. That is, measuring taVNS effect spinal motoneuron excitability, and consequently its effective spasticity in chronic stroke patients. By combining taVNS and evoked EMG responses, the influence that increased locus coeruleus activity and norepinephrine concentration is quantifiable. This influence, which has been well-documented with taVNS, also has an effect on motoneuron excitability via descending spinal cord pathways.

A current trend in neuromodulation is the use of vagus nerve stimulation (VNS) as a means to promote neuroplasticity. The vagus nerve, which is comprised of 80% afferent fibers and 20% efferent fibers, is the main visceral sensory nerve and innervates many organs throughout the body. Stimulating the vagus nerve is typically performed using surgically implanted cuff electrodes—encircling the left vagus nerve within the carotid sheath—that are connected to a pulse generator implanted in the left side of the patient's chest. The left vagus nerve is used because it has fewer efferent fibers descending to the heart than the right vagus nerve, making it a safer site for stimulation. VNS has been proven effective as a treatment for intractable epilepsy and treatment-resistant depression, and has recently been investigated for several neurological injuries such as stroke and traumatic brain injury.

The vagus nerve is known to have a direct ascending projection to the nucleus tractus solitarius (NTS) which in turn activates the locus coeruleus (LC) and nucleus basalis (NB). The LC (located in the pons) and NB (located in the basal forebrain) are part of a neuromodulatory system with diffuse projections throughout cortical and subcortical areas. The LC contains noradrenergic neurons (norepinephrine, NE), and the NB contains cholinergic neurons (acetylcholine, ACh), both of which are known to be plasticity-promoting neuromodulators. The releases of NE and ACh are important in processes such as arousal, memory encoding, and task-related behavior, as well as processes requiring high attentional load. Thus, NE and ACh could have an important role in the mechanism of action for VNS-paired rehabilitation involving goal-directed behavior.

VNS stimulation triggers bursts of NE and ACh neuromodulator release causing changes in cortical plasticity. It is thought that these changes in cortical plasticity may lead to the therapeutic effect. Specifically, VNS has been shown to lead to reorganization of rat auditory and motor cortex, with increased cortical representations of VNS-paired tones or movements, respectively. This is further supported by lesion studies that have shown that depleting NE or ACh concentrations leads to blocked cortical plasticity and impaired learning. VNS has also been shown to improve retention on the Hopkins Verbal Learning Test when delivered during the memory consolidation phase, as well as to enhance working memory evidenced by reduced error rates on an executive functioning task.

While invasive VNS has been studied for several decades, non-invasive stimulation of the vagus nerve, specifically the auricular branch, which innervates the cymba concha and tragus regions of the outer ear, has emerged as an exciting non-invasive alternative. Transcutaneous auricular VNS (taVNS) provides clear benefits in eliminating the need for an invasive surgery and reducing the possible side effects which come with an implanted device. Several functional magnetic resonance imaging (fMRI) studies have demonstrated taVNS has central effects similar to invasive VNS. For example, it has been showed that, in comparison to sham earlobe stimulation, stimulating the left cymba concha resulted in significant activation of the central vagal projections, such as the NTS and LC. Another fMRI study comparing the cymba concha and tragus as sites for taVNS found that both locations activated vagal projections, but only the cymba concha led to significant activations of the NTS and LC when compared to sham stimulation. Stimulating the vagus nerve via the outer ear has been investigated for many similar conditions as its invasive counterpart, such as epilepsy, depression, and tinnitus. Furthermore, similar to findings from invasive VNS, taVNS has also been shown to have cognitive benefits such as improved speech category learning and retention of non-native language tone categories, as well as enhanced associative memory in older adults. As it relates to motor learning, two early clinical studies using taVNS for rehabilitation in chronic stroke patients demonstrated trends towards positive changes in motor recovery.

Process

The systems and methods described herein combine taVNS with evoked EMG in chronic stroke patients. As a process, the skin is cleaned with alcohol wipes to reduce impedance, and EMG recording and stimulating electrodes are placed on the arm. EMG signals from the intrinsic hand muscles are recorded with surface gel-adhesive Ag/AgCl electrodes. To elicit motor evoked potentials, stimulating electrodes over the median and/or ulnar nerves at the wrist are used to deliver constant current stimulation. The stimulating electrode pair(s) are placed to maximize the motor response (i.e., M-wave) and avoid stimulation of other nerves. Only one nerve is stimulated at a time.

The taVNS system is set up to stimulate the patient's left ear at the cymba concha region for active stimulation or the earlobe for sham stimulation. All patients receive both active and sham taVNS, but the order is counter-balanced. Some patients may also receive an additional type of ear stimulation using a vibrotactile element to provide mechanical stimulation as opposed to electrical.

Prior to turning on any ear stimulation, the patient undergos a traditional evoked potential protocol in which a recruitment curve is first generated to identify various muscle responses. Short single electrical pulses (500 μs) are delivered when the subject's background EMG activity is within a specified range, with a minimum interstimulus interval of 1 s. Pulse amplitude is increased until the M-wave no longer increases with increasing amplitude (i.e., Mmax). At this point, the subject has the opportunity to rest before undergoing a series of single pulses at a supramaximal intensity to measure F-wave characteristics. Since the F-wave occurs above the Mmax threshold, the recruitment curve is necessary to perform before the F-wave procedure. The recruitment curve/F-wave procedure may be repeated for various stimulation sites (median and/or ulnar nerve) to establish baseline F-wave characteristics.

Once baseline measures have been taken, the series of supramaximal pulses to measure F-wave characteristics are repeated at the same intensity with taVNS and/or vibrotactile stimulation. Various parameters of the taVNS, such as amplitude, frequency, pulse width, and modality (electrical vs. vibrotactile), are varied.

In some aspects, the method includes administering vagal nerve stimulation (VNS) to a patient in need. VNS can be accomplished non-invasively by stimulating the auricular branch of the vagus nerve in the ear. This transcutaneous auricular approach has demonstrated good efficacy. In one aspect, the transcutaneous stimulation of the auricular branch of the vagus nerve is implemented using a portable TENS (transcutaneous electrical nerve stimulation) unit connected to two ear clip electrodes positioned in an ear of the subject. Without being limited to any particular theory, the external ear is an effective position for non-invasive stimulation of the vagus nerve, where the auricular branch travels in the pinna of the ear. In one aspect, the ear clips used for the VNS treatment are positioned along the concha of the ear. In another aspect the device can be wholly configured to be affixed to the ear which include the electrode, power, electronics, and wearable form factor.

Generally, a safe and effective amount of vagal nerve stimulation (VNS) is, for example, an amount that would cause the desired therapeutic effect in a subject while minimizing undesired side effects.

According to the methods described herein, the administration of VNS can be performed invasively or non-invasively. Non-limiting examples of suitable invasive methods for administering VNS include cervical neck dissection and placement of a cuff electrode directly on the vagus nerve. Non-limiting examples of suitable non-invasive methods for administering VNS include transcutaneous stimulation including, but not limited to, transcutaneous stimulation of the auricular branch of the vagus nerve using electrodes positioned on an ear of the subject.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

Optional" or "optionally" means that the subsequently described event or circumstance may or may not occur, and that the description includes instances where the event occurs and instances where it does not.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

FIG. 1 illustrates a system 100 for monitoring a patient for biomarkers while providing vagal nerve stimulation to the patient in accordance with at least one embodiment.

A current trend in neuromodulation is the use of vagus nerve stimulation (VNS) as a means to promote neuroplasticity. The vagus nerve, which is comprised of 80% afferent fibers and 20% efferent fibers, is the main visceral sensory nerve and innervates many organs throughout the body. Stimulating the vagus nerve is typically performed using surgically implanted cuff electrodes—encircling the left vagus nerve within the carotid sheath—that are connected to a pulse generator implanted in the left side of the patient's chest. The left vagus nerve is used because it has fewer efferent fibers descending to the heart than the right vagus nerve, making it a safer site for stimulation. VNS has been proven effective as a treatment for intractable epilepsy and treatment-resistant depression, and has recently been investigated for several neurological injuries such as stroke and traumatic brain injury.

The vagus nerve is known to have a direct ascending projection to the nucleus tractus solitarius (NTS) which in turn activates the locus coeruleus (LC) and nucleus basalis (NB). The LC (located in the pons) and NB (located in the basal forebrain) are part of a neuromodulatory system with diffuse projections throughout cortical and subcortical areas. The LC contains noradrenergic neurons (norepinephrine, NE), and the NB contains cholinergic neurons (acetylcholine, ACh), both of which are known to be plasticity-promoting neuromodulators. The releases of NE and ACh are important in processes such as arousal, memory encoding, and task-related behavior, as well as processes requiring high attentional load. Thus, NE and ACh could have an important role in the mechanism of action for VNS-paired rehabilitation involving goal-directed behavior.

VNS stimulation triggers bursts of NE and ACh neuromodulator release causing changes in cortical plasticity. It is thought that these changes in cortical plasticity may lead to the therapeutic effect. Specifically, VNS has been shown to lead to reorganization of rat auditory and motor cortex, with increased cortical representations of VNS-paired tones or movements, respectively. This is further supported by lesion studies that have shown that depleting NE or ACh concentrations leads to blocked cortical plasticity and impaired learning. VNS has the capability to improve human recognition memory when administered at a moderate intensity. VNS has also been shown to improve retention on the Hopkins Verbal Learning Test when delivered during the memory consolidation phase, as well as to enhance working memory evidenced by reduced error rates on an executive functioning task.

While invasive VNS has been studied for several decades, non-invasive stimulation of the vagus nerve, specifically the auricular branch, which innervates the cymba concha and tragus regions of the outer ear, has emerged as an exciting non-invasive alternative. Transcutaneous auricular VNS (taVNS) provides clear benefits in eliminating the need for an invasive surgery and reducing the possible side effects which come with an implanted device. Several functional magnetic resonance imaging (fMRI) studies have demonstrated taVNS has central effects similar to invasive VNS. In comparison to sham earlobe stimulation, stimulating the left cymba concha has been shown to result in significant activation of the central vagal projections, such as the NTS and LC. Another fMRI study comparing the cymba concha and tragus as sites for taVNS found that both locations activated vagal projections, but only the cymba concha led to significant activations of the NTS and LC when compared to sham stimulation. Stimulating the vagus nerve via the outer ear has been investigated for many similar conditions as its invasive counterpart, such as epilepsy, depression, and tinnitus. Furthermore, similar to findings from invasive VNS, taVNS has also been shown to have cognitive benefits such as improved speech category learning and retention of non-native language tone categories, as well as enhanced associative memory in older adults.

The disclosed system 100 for rehabilitating a motor function includes the use the frequency of F-wave occurrence within an evoked electromyography (EMG) paradigm as a rapid biomarker of motoneuron excitability. The taVNS intensity can directly affect F-wave frequency, specifically that moderate amplitudes of taVNS reduce the frequency of F-waves, but higher amplitudes conversely increase the frequency of F-waves. This is based on the functional anatomy of descending spinal cord pathways originating from the brainstem, where auricular branch vagal fibers terminate; i.e., the pontine and medullary reticulospinal tracts. Within the context of this pathway, at lower intensities, taVNS activates fibers of the medullary reticulospinal tracts, which have an inhibitory effect on spinal reflexes, but that once a certain intensity is reached, taVNS activates pontine reticulospinal tract fibers, which have faciliatory effects on muscle tone and spinal reflexes The system 100 includes a VNS controller 105. The VNS controller 105 can be a computer device, such as a tablet, laptop, desktop, or other dedicated computer device including at least one processor in communication with at least one memory device. The VNS controller 105 can also include a user interface that that allows the VNS controller 105 to present information to a user and receive user inputs.

The VNS controller 105 is in communication with a power supply 110 configured to provide VNS electrical stimulation. The VNS controller 105 can also be in communication with one or more electrodes, such as a first electrode 115 and a second electrode 120. The first electrode 115 and the second electrode 120 are configured to provide the VNS electrical stimulation to the patient. In some embodiments, first electrode 115 and second electrode 120 are permanent, re-usable electrodes. In other embodiments first electrode 115 and second electrode 120 are disposable, single use electrodes. In still further embodiments, one or more of the first electrode 115 and the second electrode 120 are implanted in the patient to stimulate the vagus nerve. In additional embodiments, the first electrode 115 and the second electrode are temporarily attached to the patient's ear to stimulate the vagus nerve. In other embodiments, the first electrode 115 and the second electrode 120 provide electrical stimulation, vibration, or ultrasonic methods of activating the nerve.

In at least one embodiment, the VNS controller 105 is configured to provide treatment to the vagus nerve by electrically stimulation for a period of twenty minutes. In at least one embodiment, the attributes of the VNS electrical stimulation are 20 Hz, 250 µs, and 0.4 mA. In other embodiments, the current can range between 0.4 and 8 mA. The attributes of the VNS may vary throughout the treatment. In some embodiments, the attributes of the VNS a varied until optimum conditions are achieved and then the attributes of the VNS are stabilized. In the exemplary embodiment, the attributes of the VNS are selected to corresponding to desired attributes of the F-wave. In at least one embodiment, the attributes of the VNS are selected to maximize vagus somatosensory evoked potentials while avoiding perception of pain.

In the exemplary embodiment, the VNS controller 105 controls the output of the power supply 110 to provide the VNS via the first electrode 115 and the second electrode 120.

In some further embodiments, VNS controller 105 is in communication with one or more user computer devices 125. The user computer device 125 may provide information to the VNS controller 105, such as one or more attributes of the patient that may alter the VNS electrical stimulation applied to the patient. Other information may include VNS electrical stimulation attributes to achieve Mmax and baseline F-wave characteristics. Furthermore, the user computer device 125 may provide timing information to the VNS controller 105, such as when to apply the electrical stimulation. Moreover, the user computer device 125 can receive information from the VNS controller 105, such as what were the attributes of the VNS or other electrical stimulation that was applied to the patient.

In the exemplary embodiment, prior to turning on any VNS stimulation, an electrical stimulator 135 can be used for a traditional evoked potential protocol in which a recruitment curve is first generated to identify various muscle responses. The electrical stimulator 135 delivers short single electrical pulses (500 µs) when sensors 130 detect that the patient's background EMG activity is within a specified range, with a minimum interstimulus interval of 1 s. The user computer device 125 can increase the pulse amplitude of the electrical stimulator 135 until the sensors 130 detect that the M-wave no longer increases with increasing amplitude (i.e., $M_{max}$). At this point, the patient can be given an opportunity to rest before the electrical stimulator 135 transmits a series of single pulses at a supramaximal intensity to measure F-wave characteristics. Since the F-wave only occurs above the $M_{max}$ threshold, the recruitment curve is necessary to perform before the F-wave procedure. The electrical stimulator 135 may repeat the recruitment curve/F-wave procedure for various stimulation sites (median and/or ulnar nerve) to establish baseline F-wave characteristics.

The sensors 130 can be used to determine the optimal taVNS parameters. In the exemplary embodiment, the sensors 130 include electromyography (EMG). The sensors 130 may also include other sensors 130 to measure the attributes of the patient to detect both the M-wave and the F-wave characteristics. The sensors 130 may further monitor the overall health of the patient while undergoing the procedures described herein.

In some embodiments, the sensors 130 include stereotactic electroencephalography (sEEG). The sensors 130 can then be used to monitor the effects of stimulation parameters on the subject's brain activity. During these tasks, the sensors 130 may report the effect of stimulation frequency, pulse-width, and current intensity on the subject's brain activity. This may be used to find ideal parameters and/or adjust parameters to each individual subject. In at least one embodiment, parameter monitoring may be performed by monitoring a subject while they engage in a motor learning task paradigm (Serial Reaction Time Task, SRTT). The user computer device 125 can collect electrophysiological, behavioral, and kinematic data in order to fully characterize the effects of taVNS on motor learning. Other sensors 130 can include, but are not limited to, temperature, brain wave activity, galvanic response, blood pressure, heart rate, and/or any other attribute or statistic of the patient that is desired.

The user computer device 125 monitors the patient's brain activity and response to the taVNS stimulation. In some embodiments, the user computer device 125 adjusts the output of the VNS controller 105 to maximize the patient's results.

In some additional embodiments, the sensor 130 is capable of monitoring gamma band activity in the patient. The user computer device 125 may use the gamma band activity as a guideline of when to adjust the output of the VNS controller 105 to maximize the gamma band activity. 20-minutes of taVNS can induce a temporary post-stimulation increase in gamma activity. The decay of the stimulation-induced gamma augmentation indicates that taVNS-induced physiological changes are transient and return to normal within approximately five minutes after stimulation. Gamma band activity has been shown by several electrocorticographic (ECOG) studies to exhibit a strong correlation with certain aspects of motor, language, or cognitive function, and it is considered to represent local cortical processing. More specifically, increases in gamma power in the sensory cortex have been tied to increased attention and network engagement with a motor task. Since taVNS can cause a robust increase in this frequency band, these combination shows that taVNS is an effective approach for enhancing motor learning in chronic stroke patients by creating a more active overall brain state.

Figure 2:
FIG. 2 illustrates placement of electrodes for non-invasive transcutaneous vagus nerve stimulation using the system shown in FIG. 1.

FIG. 2 illustrates placement of electrodes 115 and 120 (shown in FIG. 1) for non-invasive transcutaneous vagus nerve stimulation using the system 100 (shown in FIG. 1). In FIG. 2, the VNS controller 105 (shown in FIG. 1) is a part of a portable TENS (transcutaneous electrical nerve stimulation) unit. The TENS is connected to two the two electrodes 115 and 120.

In the exemplary embodiment, the first electrode 115 and the second electrode 120 are placed along the concha of the ear to stimulate the vagus nerve where the auricular branch travels in the pinna of the ear. In the exemplary embodiment, the first electrode 115 and the second electrode are attached to the patient's left ear.

Figure 3:
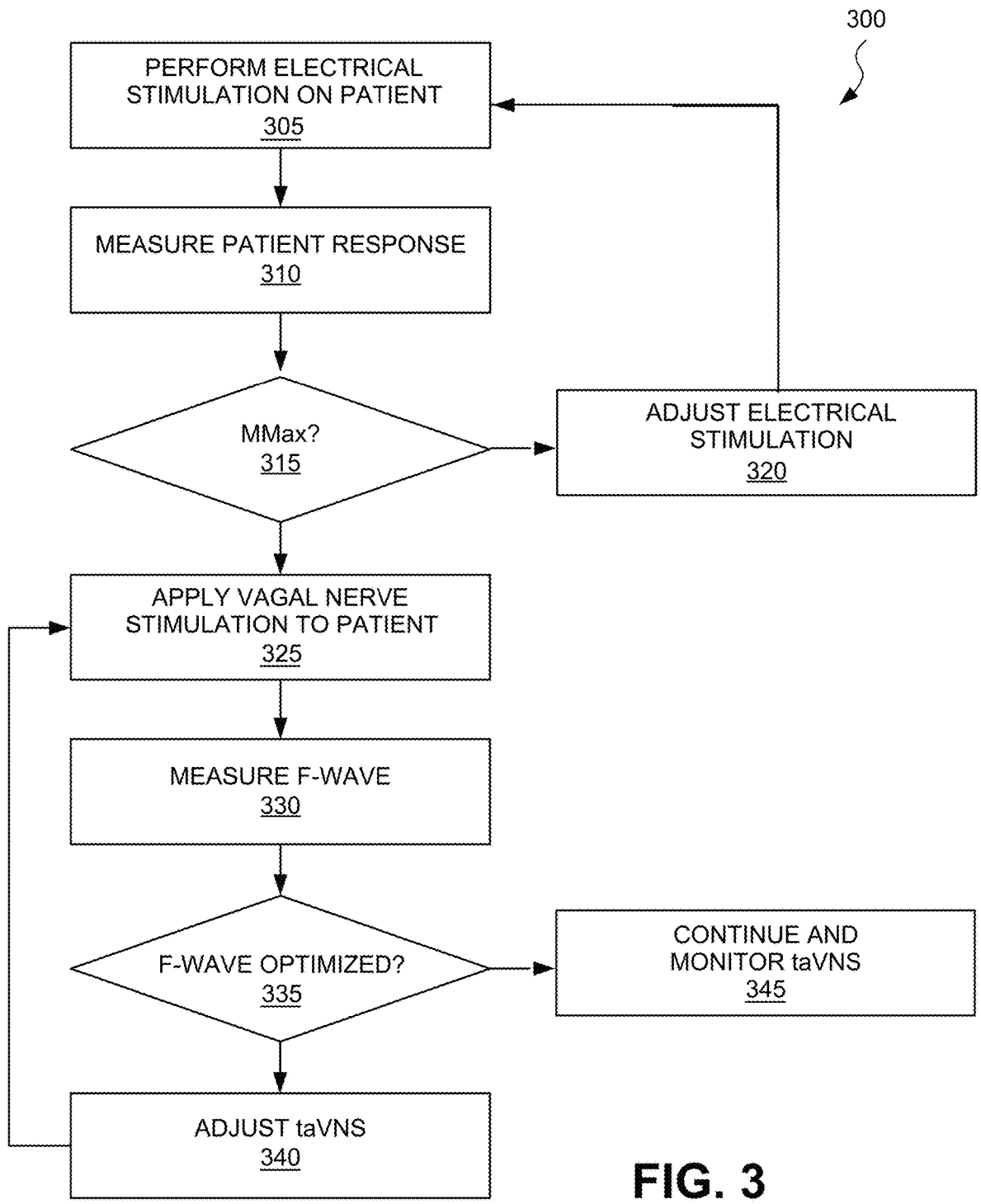
FIG. 3 illustrates a process for monitoring a patient for biomarkers while providing vagal nerve stimulation using the system shown in FIG. 1.

FIG. 3 illustrates a process 300 for monitoring a patient for biomarkers while providing vagal nerve stimulation using the system 100 (shown in FIG. 1). In the exemplary embodiment, portions of process 300 are performed by a user computer device 125 (shown in FIG. 1), which may be, but is not limited to, a tablet, a laptop, a desktop, and/or and other computer device including at least one processor in communication with at least one memory device. Additionally, portions of process 300 are performed by the VNS controller 105 and/or the electrical stimulator 135 (both shown in FIG. 1).

In the exemplary embodiment, the user computer device 125 controls the electrical stimulator 135 to perform 305 electrical stimulation on a patient. The electrical stimulation is a traditional evoked potential protocol in which a recruitment curve is first generated to identify various muscle responses. The electrical stimulator 135 delivers short single electrical pulses (500 µs) when sensors 130 detect that the patient's background EMG activity is within a specified range, with a minimum interstimulus interval of 1 s. The sensors 130 measure 310 the patient response to the electrical stimulation. The patient response include detecting the M-wave. The user computer device 125 determines 315 if the M-wave is at its maximum (i.e., $M_{max}$). If the M-wave is not at the maximum, the user computer device 125 adjusts 320 the electrical stimulation by increasing the pulse amplitude of the electrical stimulator 135 until the sensors 130 detect that the M-wave no longer increases with increasing amplitude (i.e., $M_{max}$). At this point, the patient can be given an opportunity to rest before the electrical stimulator 135 transmits a series of single pulses at a supramaximal intensity to measure F-wave characteristics. Since the F-wave only occurs above the $M_{max}$ threshold, the recruitment curve is necessary to perform before the F-wave procedure. The electrical stimulator 135 may repeat the recruitment curve/F-wave procedure for various stimulation sites (median and/or ulnar nerve) to establish baseline F-wave characteristics.

In the exemplary embodiment, the user computer device 125 uses the parameters of the electrical stimulator 135 for baseline F-wave characteristics to generate appropriate parameters for taVNS stimulation of the patient. In some embodiments, the user computer device 125 also bases the appropriate parameters for taVNS stimulation on historical analysis of a plurality of historical patients and their F-wave activity to different taVNS parameters and also based on their patient attributes. In some embodiments, the user computer device 125 trains an artificial intelligence and/or machine learning model based on the historical data for the plurality of patients. In some of these embodiments, the model also includes historical information for the current patient based on previous treatments.

The healthcare provider may apply 325 vagal nerve stimulation to the patient using the system 100 (shown in FIG. 1). The healthcare provider attaches two electrodes (first electrode 115 and second electrode 120 (shown in FIG. 1)) to the concha of the left ear of the patient, as further shown in FIG. 2. The VNS controller 105 then provides a current through the electrodes 115 and 120. In the exemplary embodiment, the current has the following attributes: 20 Hz, 250 µs, and 8 mA. The current can range from 0.2 mA to 8 mA. The pulse width can range from 100 to 500 µs. The frequency can range from 20 to 40 Hz. Furthermore, other attributes of the current can change depending on other factors, such as the attributes of the patient. In some embodiments, the electrical stimulation remains at the same attributes during the entire period of stimulation. In other embodiments, the electrical stimulation is started at a lower current and the VNS controller 105 increases the current over time.

In the exemplary embodiment, the sensors 130 (shown in FIG. 1) measure 330 the F-wave of the patient in real-time. The user computer device 125 determines 335 if the detected F-Wave of the patient is optimized. In the exemplary embodiment, the detected gamma activity is optimized if the F-wave is raised by a threshold amount, by a threshold percentage, to over a threshold value, or within a threshold range. In some embodiments, the model is used to determine the optimized F-wave. If the F-wave is not optimized, the user computer device 125 and/or the VNS controller 105 adjusts 340 the taVNS parameters and the new parameters are applied 325 to the patient via VNS.

If the F-wave is optimized, the user computer device 125 continues 345 VNS at those parameters and monitors the patient. The patient statistics may be analyzed to determine the patient's progress as well as a notification of when the patient should discontinue the treatment session.

In at least one example, the activity takes up to twenty minutes. During that time, the VNS controller 105 applies 325 VNS to the patient. When the activity is over, the VNS is discontinued, and the patient is disconnected from the electrodes 115 and 120. In other embodiments, the exercise treatment only takes a few minutes, but the length of the treatment increases incrementally over time, where the patient works up to being able to handle longer treatments. In other embodiments, the patient may receive treatment for one side of the body, the other, or both either serially or simultaneously. In some embodiments, the patient's statistics are monitored after the VNS is discontinued to monitor how the patient's statistics return to baseline.

In some embodiments, the user computer device 125 receives patient attributes. The patient attributes could be received when the patient checks in or by retrieving the patient history. The patient attributes can include but are not limited to, height, weight, gender, heart rate, blood pressure, medical history, reasons for admittance, bloodwork results, vital statistics, presence/location of an aneurysm on vascular imaging, motor limitations, and other attributes. The patient attributes can further include CT (Computed tomography) imaging of stroke damaged nervous tissue. The patient attributes can be analyzed to generate the parameters for the taVNS stimulation based on the analyzed patient attributes.

In the exemplary embodiment, the user computer device 125 trains brain models using historical data from a plurality of patients. Then the user computer device 125 receives information about an individual patient to train a brain model of that patient. In some embodiments, the user computer device 125 trains the brain model of the patient over a plurality of treatments based on how the patient's brain reacts to different levels of stimulation during the treatments. The user computer device 125 can use the brain model to fine tune the settings of the VNS controller 105 to provide optimal gamma activity. In some embodiments, the brain models are based on T1-weighted structural magnetic resonance images (MRI) and/or computed tomography (CT) scans.

The sensor information will also be filtered with highpass/lowpass/notch filtered to remove environmental noise. In some embodiments, time periods with artifacts or pathological activity defined as greater than 10 seconds of artifact or one or more spikes larger than a five-fold increase in the magnitude of the baseline signal will be rejected. Band-limited amplitude timeseries can be extracted by convolving a Gabor wavelet of the desired frequency or frequency band with the preprocessed signal. Power envelopes for each signal can be calculated by squaring the absolute value of the amplitude timeseries. The overall power for a segment of the sensor recordings can be estimated by calculating the mean of the power envelope for that segment. Power in the resting period can be calculated for delta (1-3 Hz), theta (4-7 Hz) mu (8-12 Hz), beta (13-30 Hz), and broadband gamma bands (70-170 Hz).

In the exemplary embodiment, the VNS controller 105 stimulates 325 a cutaneous distribution of a patient's vagus nerve within a patient's ear with a nerve stimulating signal. The sensors 130 detect 330 F-wave occurrence with an evoked electromyography paradigm. The VNS controller 105 and/or the user computer device 125 adjusts 340 one or more parameters of the nerve stimulating signal to change the F-wave occurrence.

In the exemplary embodiment, the user computer device 125 and/or the electrical stimulator 135 generate a recruitment curve based on traditional evoked potential protocol. The sensors 130 and/or the user computer device 125 detect 310 an M-wave occurrence during the traditional evoked potential protocol. The user computer device 125 and/or the electrical stimulator 135 adjust 320 one or more parameters of the traditional evoked potential protocol to affect the M-wave occurrence. The sensors 130 and/or the user computer device 125 detect 330 the F-wave occurrence when an M-wave occurrence is at a maximum 315. The user computer device 125 and/or VNS controller 105 determine one or more attributes of the nerve stimulating signal based on a plurality of parameters of the traditional evoked potential protocol when the M-wave occurrence is at a maximum. The VNS controller 105 and/or the electrical stimulator 135 transmit electrical pulses via the nerve stimulating signal when the patient's background EMG is in a particular range. The sensors 130 observe F-wave characteristics and the user computer device 125 analyzes analyzed while the patient receives varying pulses via nerve stimulating signal.

In the exemplary embodiment, the F-wave characteristics are used for a closed-loop VNS treatment system to optimize a therapeutic effect. The therapeutic effect includes, but is not limited to, at least one of changing neuroplasticity, altering parasympathetic tone, reducing seizures, immunomodulation, or reducing inflammation.

In some embodiments, the stimulation is electrical stimulation of the vagus nerve. In other embodiments, the stimulation is vibrotactile stimulation of the vagus nerve. In the exemplary embodiment, the stimulation is provided via a first electrode 115 and a second electrode 120. The first electrode 115 and the second electrode 120 are attached to the concha of the patient's ear. In some embodiments, the first electrode 115 and the second electrode 120 are attached to the patient's left ear. The stimulation may be provided to the auricular branch of the vagus nerve where the vagus nerve travels in the pinna of the ear.

In some further embodiments, the user computer device 125 receives a plurality of patient attributes associated with the patient. The user computer device 125 analyzes the plurality of patient attributes. The user computer device 125 determines one or more parameters of the nerve stimulating signal based on the analyzed patient attributes.

In additional embodiments, the user computer device 125 receives a plurality of monitored statistics of the patient from previous treatments. The user computer device 125 analyzes the plurality of monitored statistics. The user computer device 125 determines one or more parameters of the nerve stimulating signal based on the analyzed monitored statistics.

Figure 4:
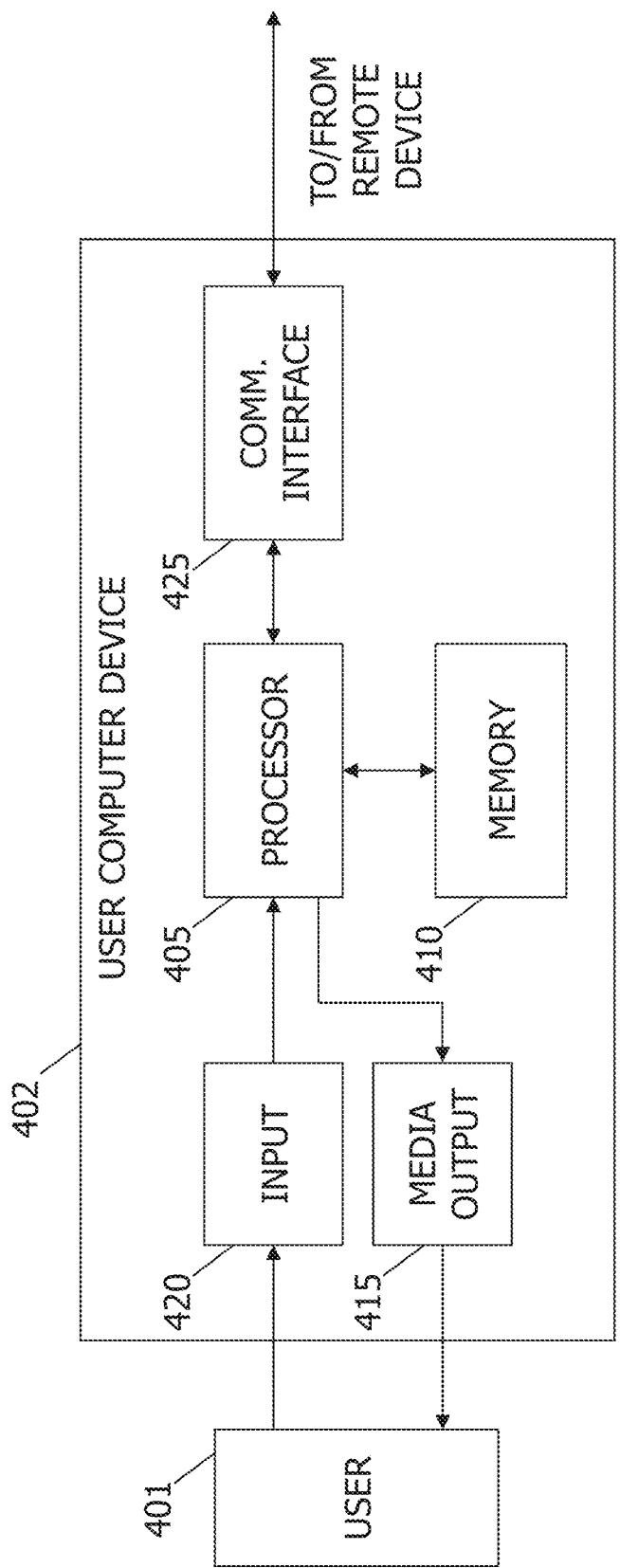
FIG. 4 illustrates an example configuration of a client system shown in FIG. 3, in accordance with one embodiment of the present disclosure.

FIG. 4 illustrates an example configuration of a client system shown in FIG. 3, in accordance with one embodiment of the present disclosure. User computer device 402 is operated by a user 401. User computer device 402 may include, but is not limited to, VNS controller 105, user computer device 125, and electrical stimulator 135 (all shown in FIG. 1). User computer device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or transaction data to be stored and retrieved. Memory area 410 may include one or more computer-readable media.

User computer device 402 also includes at least one media output component 415 for presenting information to user 401. Media output component 415 is any component capable of conveying information to user 401. In some embodiments, media output component 415 includes an output adapter (not shown) such as a video adapter and/or an audio adapter. An output adapter is operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 415 is configured to present a graphical user interface (e.g., a web browser and/or a client application) to user 401. A graphical user interface may include, for example, patient attributes or the attributes of the electrical stimulation. In some embodiments, user computer device 402 includes an input device 420 for receiving input from user 401. User 401 may use input device 420 to, without limitation, select to apply the electrical stimulation to the patient. Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as a VNS controller 105 or a user computer device 125. Communication interface 425 may include, for example, a wired or wireless network adapter and/or a wireless data transceiver for use with a mobile telecommunications network.

Stored in memory area 410 are, for example, computer-readable instructions for providing a user interface to user 401 via media output component 415 and, optionally, receiving and processing input from input device 420. The user interface may include, among other possibilities, a web browser and/or a client application. Web browsers enable users, such as user 401, to display and interact with media and other information typically embedded on a web page or a website provided by a server. A client application allows user 401 to interact with, for example, VNS controller 105. For example, instructions may be stored by a cloud service and the output of the execution of the instructions sent to the media output component 415.

The methods and systems described herein may be implemented using computer programming or engineering techniques including computer software, firmware, hardware, or any combination or subset thereof, wherein the technical effects may be achieved by performing at least one of the following steps: a) stimulating a cutaneous distribution of a patient's vagus nerve within a patient's ear with a nerve stimulating signal; b) detecting F-wave occurrence with an evoked electromyography paradigm, wherein F-wave characteristics are observed and analyzed while the subject receives varying pulses via nerve stimulating signal; c) adjusting one or more parameters of the nerve stimulating signal to change the F-wave occurrence; d) generating a recruitment curve based on traditional evoked potential protocol; e) detecting an M-wave occurrence during the traditional evoked potential protocol; f) adjusting one or more parameters of the traditional evoked potential protocol to affect the M-wave occurrence; g) detecting the F-wave occurrence when an M-wave occurrence is at a maximum; h) determining one or more attributes of the nerve stimulating signal based on a plurality of parameters of the traditional evoked potential protocol when the M-wave occurrence is at a maximum; i) transmitting electrical pulses via the nerve stimulating signal when the patient's background EMG is in a particular range; j) using the F-wave characteristics for a closed-loop VNS treatment system to optimize a therapeutic effect, wherein the therapeutic effect includes at least one of changing neuroplasticity, altering parasympathetic tone, reducing seizures, immunomodulation, or reducing inflammation; k) wherein the stimulation is electrical stimulation of the vagus nerve, l) wherein the stimulation is vibrotactile stimulation of the vagus nerve. m) wherein the stimulation is provided via a first electrode and a second electrode, wherein the first electrode and the second electrode are attached to the concha of the patient's ear, wherein the first electrode and the second electrode are attached to the patient's left ear, n) wherein the stimulation is provided to the auricular branch of the vagus nerve where the vagus nerve travels in the pinna of the ear, o) receiving a plurality of patient attributes associated with the patient; p) analyzing the plurality of patient attributes; q) determining one or more parameters of the nerve stimulating signal based on the analyzed patient attributes; r) receiving a plurality of monitored statistics of the patient from previous treatments; s) analyzing the plurality of monitored statistics; and t) determining one or more parameters of the nerve stimulating signal based on the analyzed monitored statistics.

A computer program of one embodiment is embodied on a computer-readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, traffic timing, previous trips, and/or actual timing. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, signal processing, optical character recognition, and/or natural language processing-either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to determine brain responses to stimuli such as VNS settings.

Based upon these analyses, the processing element may learn how to identify characteristics and patterns that may then be applied to analyzing image data, model data, and/or other data. For example, the processing element may learn, to identify brain responses to stimuli and the VNS settings for different patients to provide optimal gamma activity. The processing element may also learn how to identify trends that may not be readily apparent based upon collected traffic data, such as trends that identify when gamma activity will spike or decline.

The exemplary systems and methods described and illustrated herein therefore provide VNS treatments for changing neuroplasticity, altering parasympathetic tone, reducing seizures, immunomodulation, or reducing inflammation.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., trust stores, authentication information, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

What is claimed is:

1. A method for detecting motoneuron excitability in a subject in need, the method comprising:
   stimulating a cutaneous distribution of a patient's vagus nerve within a patient's ear with a nerve stimulating signal;
   detecting an M-wave occurrence during a traditional evoked potential protocol;
   detecting an F-wave occurrence with an evoked electromyography (EMG) paradigm when the M-wave occurrence is at a maximum; and
   adjusting one or more parameters of the nerve stimulating signal to change the F-wave occurrence.

2. The method of claim 1 further comprising generating a recruitment curve based on the traditional evoked potential protocol.

3. The method of claim 2 further comprising:
   adjusting one or more parameters of the traditional evoked potential protocol to affect the M-wave occurrence.

4. The method of claim 1 further comprising detecting the patient's background EMG, wherein the nerve stimulating signal transmits electrical pulses when the patient's background EMG is in a particular range.

5. The method of claim 1 further comprising determining one or more attributes of the nerve stimulating signal based on a plurality of parameters of the traditional evoked potential protocol when the M-wave occurrence is at a maximum.

6. The method of claim 1, wherein F-wave characteristics are observed and analyzed while the patient receives varying pulses via nerve stimulating signal.

7. The method of claim 6, wherein the F-wave characteristics are used for a closed-loop VNS treatment system to optimize a therapeutic effect.

8. The method of claim 7, wherein the therapeutic effect includes at least one of changing neuroplasticity, altering parasympathetic tone, reducing seizures, immunomodulation, or reducing inflammation.

9. The method of claim 1, wherein the stimulation is electrical stimulation of the vagus nerve.

10. The method of claim 1, wherein the stimulation is vibrotactile stimulation of the vagus nerve.

11. The method of claim 9, wherein the stimulation is provided via a first electrode and a second electrode, wherein the first electrode and the second electrode are attached to the concha of the patient's ear.

12. The method of claim 11, wherein the first electrode and the second electrode are attached to the patient's left ear.

13. The method of claim 12, wherein the stimulation is provided to the auricular branch of the vagus nerve where the vagus nerve travels in the pinna of the ear.

14. The method of claim 1 further comprising:
   receiving a plurality of patient attributes associated with the patient;
   analyzing the plurality of patient attributes; and
   determining one or more parameters of the nerve stimulating signal based on the analyzed patient attributes.

15. The method of claim 1 further comprising:
   receiving a plurality of monitored statistics of the patient from previous treatments;
   analyzing the plurality of monitored statistics; and
   determining one or more parameters of the nerve stimulating signal based on the analyzed monitored statistics.

16. A system for detecting motoneuron excitability in a subject in need, the system comprising:
- an electrical stimulation device including one or more electrodes, wherein the electrical stimulation device is configured to provide an electrical current to a patient's vagus nerve with an electrical signal, wherein the electrical signal is a nerve stimulating signal configured to stimulate a cutaneous distribution of a patient's vagus nerve within a patient's ear with a nerve stimulating signal, and wherein the electrical stimulation device is further configured to transmit electrical pulses via the nerve stimulating signal when the patient's background EMG is in a particular range; and
- at least one sensor one or more sensors configured to detect an M-wave occurrence during a traditional evoked potential protocol and detect an F-wave occurrence with an evoked electromyography (EMG) paradigm when the M-wave occurrence is at a maximum, wherein the electrical stimulation device is further configured to adjust one or more parameters of the nerve stimulating signal to change the F-wave occurrence.

17. The system of claim 16, wherein F-wave characteristics are used for a closed-loop VNS treatment system to optimize a therapeutic effect, wherein the therapeutic effect includes at least one of changing neuroplasticity, altering parasympathetic tone, reducing seizures, immunomodulation, or reducing inflammation.

18. The system of claim 16 further comprising an electrical stimulator configured to:
- generate a recruitment curve based on traditional evoked potential protocol; and
- adjust one or more parameters of the traditional evoked potential protocol to affect the M-wave occurrence,
wherein the at least one sensor is configured to:
- detect the M-wave occurrence during the traditional evoked potential protocol; and
- detect the F-wave occurrence when the M-wave occurrence is at a maximum.

19. The system of claim 16, wherein the stimulation is at least one of electrical stimulation of the vagus nerve and vibrotactile stimulation of the vagus nerve.

20. The system of claim 16, wherein the stimulation is provided via a first electrode and a second electrode, wherein the first electrode and the second electrode are attached to the concha of the patient's ear, wherein the first electrode and the second electrode are attached to the patient's left ear, and wherein the stimulation is provided to the auricular branch of the vagus nerve where the vagus nerve travels in the pinna of the ear.

* * * * *